(12) United States Patent
Krogdahl et al.

(10) Patent No.: US 9,266,310 B2
(45) Date of Patent: Feb. 23, 2016

(54) METHODS OF JOINING DEVICE STRUCTURES WITH ADHESIVE

(75) Inventors: James R. Krogdahl, Cupertino, CA (US); James M. Cuseo, Los Altos, CA (US)

(73) Assignee: Apple Inc., Cupertino, CA (US)

(*) Notice: Subject to any disclaimer, the term of this patent is extended or adjusted under 35 U.S.C. 154(b) by 213 days.

(21) Appl. No.: 13/329,010

(22) Filed: Dec. 16, 2011

(65) Prior Publication Data

US 2013/0153128 A1   Jun. 20, 2013

(51) Int. Cl.
*B29C 65/00* (2006.01)
*B32B 17/10* (2006.01)
*B32B 37/00* (2006.01)
*B32B 38/00* (2006.01)
*B31B 1/60* (2006.01)
*B32B 37/12* (2006.01)

(52) U.S. Cl.
CPC ............ *B32B 37/003* (2013.01); *B32B 37/1284* (2013.01); *B32B 2305/34* (2013.01); *B32B 2457/00* (2013.01); *Y10T 156/1002* (2015.01)

(58) Field of Classification Search
CPC   B29C 65/00; B29C 35/08; B29C 2035/0827; B29C 65/4825; B29C 65/4845; B32B 17/10; B32B 37/00; B32B 38/00; B32B 38/04; B31B 1/60; H05B 6/00; H05B 7/00
USPC ........ 156/283, 60, 285, 286; 90/283, 60, 285, 90/286, 272.2, 273.3, 273.7, 275.5, 275.7; 264/405, 494, 496
See application file for complete search history.

(56) References Cited

U.S. PATENT DOCUMENTS

| 3,823,794 | A | * | 7/1974 | Bre | B32B 17/10036 156/99 |
|---|---|---|---|---|---|
| 4,308,296 | A |  | 12/1981 | Chitouras |  |
| 4,472,124 | A | * | 9/1984 | Kashihara | B29C 43/02 264/107 |
| 5,106,441 | A |  | 4/1992 | Brosig et al. |  |
| 5,466,325 | A | * | 11/1995 | Mizuno | B29C 63/0013 156/234 |
| 5,530,227 | A | * | 6/1996 | Matsen | B21D 26/021 219/603 |
| 5,541,367 | A |  | 7/1996 | Swamy |  |

(Continued)

OTHER PUBLICATIONS

Zadeskey, U.S. Appl. No. 12/571,295, filed Sep. 30, 2009.

(Continued)

*Primary Examiner* — Michael N Orlando
*Assistant Examiner* — Matthew Hoover
(74) *Attorney, Agent, or Firm* — Treyz Law Group, P.C.; Joseph F. Guihan (57) ABSTRACT

Structures such as layers of material associated with an electronic device may be assembled using adhesive. The adhesive may be dispensed onto the surface of an electronic device layer in liquid form. The liquid adhesive material may be a liquid pressure sensitive adhesive precursor material. Patterned structures such as touch sensor electrodes, black ink masking layers, and other structures may be formed on the electronic device layer. The use of liquid adhesive material may help the adhesive material flow over the edges of the patterned structures without forming bubbles or voids. Following application of the liquid pressure sensitive adhesive precursor material, the liquid pressure sensitive adhesive precursor material may be cured to form a solid layer of pressure sensitive adhesive. The layer of material on which the solid layer of pressure sensitive adhesive has been formed may then be vacuum laminated to an additional electronic device layer.

22 Claims, 10 Drawing Sheets

(56) References Cited

U.S. PATENT DOCUMENTS

| | | |
|---|---|---|
| 5,771,254 A | 6/1998 | Baldwin et al. |
| 5,892,203 A | 4/1999 | Jordan et al. |
| 5,948,175 A | 9/1999 | Glenn |
| 5,958,447 A * | 9/1999 | Haralambopoulos .. A61K 9/703 424/401 |
| 6,104,565 A | 8/2000 | Bruner et al. |
| 6,171,105 B1 | 1/2001 | Sarmadi |
| 6,249,370 B1 | 6/2001 | Takeuchi et al. |
| 6,319,433 B1 | 11/2001 | Kohan |
| 6,376,148 B1 | 4/2002 | Liu et al. |
| 6,437,669 B1 | 8/2002 | Welstand et al. |
| 6,867,504 B2 | 3/2005 | Lichtenwalter et al. |
| 7,012,189 B2 | 3/2006 | Kriege et al. |
| 7,033,910 B2 | 4/2006 | Faris |
| 7,135,090 B2 | 11/2006 | Cheng et al. |
| 7,195,687 B2 | 3/2007 | Hayashi et al. |
| 7,276,132 B2 | 10/2007 | Davies et al. |
| 7,310,872 B2 | 12/2007 | Kriege et al. |
| 7,351,368 B2 | 4/2008 | Abrams |
| 7,372,535 B2 | 5/2008 | Tashiro |
| 7,427,332 B2 | 9/2008 | Takemoto et al. |
| 7,498,062 B2 | 3/2009 | Calcaterra et al. |
| 7,636,244 B2 | 12/2009 | Kriege et al. |
| 8,205,327 B2 | 6/2012 | Miyakawa et al. |
| 2001/0038144 A1 * | 11/2001 | Grigg ........................... 257/698 |
| 2002/0005819 A1 | 1/2002 | Ronzani et al. |
| 2003/0178134 A1 | 9/2003 | Muramoto et al. |
| 2004/0050485 A1 | 3/2004 | Speer et al. |
| 2004/0134603 A1 | 7/2004 | Kobayashi et al. |
| 2004/0238111 A1 | 12/2004 | Siegel |
| 2005/0139309 A1 * | 6/2005 | Savoie ................. B24B 13/005 156/99 |
| 2005/0200371 A1 | 9/2005 | Yakymyshyn et al. |
| 2006/0022154 A1 | 2/2006 | Schmitkons et al. |
| 2006/0029784 A1 * | 2/2006 | Doan .................... C09J 7/0246 428/220 |
| 2006/0127594 A1 | 6/2006 | Siegel |
| 2006/0137901 A1 | 6/2006 | Yu et al. |
| 2006/0204670 A1 | 9/2006 | Siegel |
| 2007/0026189 A1 | 2/2007 | Abrams |
| 2007/0187027 A1 | 8/2007 | Tausch et al. |
| 2007/0221978 A1 | 9/2007 | Tsuji |
| 2007/0227670 A1 | 10/2007 | Kobayashi et al. |
| 2007/0254117 A1 | 11/2007 | Graydon et al. |
| 2008/0023639 A1 | 1/2008 | Kawasaki et al. |
| 2008/0038570 A1 * | 2/2008 | Satou ........................ C08F 2/48 428/483 |
| 2008/0230177 A1 * | 9/2008 | Crouser ............ G02F 1/133502 156/275.5 |
| 2009/0002338 A1 * | 1/2009 | Kinoshita ................ G06F 3/045 345/174 |
| 2009/0032112 A1 | 2/2009 | Teach et al. |
| 2009/0102882 A1 | 4/2009 | Silverbrook et al. |
| 2009/0128518 A1 * | 5/2009 | Kinoshita ................ G06F 3/044 345/174 |
| 2009/0288756 A1 * | 11/2009 | Dunn ................. B32B 17/10908 156/107 |
| 2009/0294692 A1 | 12/2009 | Bourke, Jr. et al. |
| 2010/0026659 A1 | 2/2010 | Long et al. |
| 2010/0134439 A1 | 6/2010 | Ito et al. |
| 2010/0177032 A1 * | 7/2010 | Yamada ........................ 345/107 |
| 2011/0012845 A1 | 1/2011 | Rothkopf et al. |
| 2011/0292623 A1 | 12/2011 | Stanley |
| 2012/0050958 A1 * | 3/2012 | Sanford et al. ........... 361/679.01 |
| 2012/0068353 A1 * | 3/2012 | Huang .................. H01L 21/561 257/774 |
| 2012/0206376 A1 | 8/2012 | Lin |

OTHER PUBLICATIONS

Hill et al., U.S. Appl. No. 12/753,005, filed Apr. 1, 2010.

Krogdahl et al., U.S. Appl. No. 13/567,949, Aug. 6, 2012.

Anders et al., "Conductive Adhesives vs Solder Paste: A Comparative Life Cycle Based Screening, Abstract", Advances in Life Cycle Engineering for Sustainable Manufacturing, 2007 (p. 285).

Glaser, "Colorants and Special Additives for Laser Welding", Joining Plastics 2006, Apr. 25-26, 2006 (5 pages).

* cited by examiner

METHODS OF JOINING DEVICE STRUCTURES WITH ADHESIVE

BACKGROUND

This relates generally to electronic devices, and more particularly, to joining electronic device structures using adhesive.

Adhesives are widely used to assemble components for electronic devices such as computers, cellular telephones, media players, and other electronic equipment. For example, sheets of pressure sensitive adhesive are often used to join planar structures. Planar structures may, for example, be laminated together with pressure sensitive adhesive using lamination equipment. Pressure sensitive adhesive layers are, however, only able to accommodate a limited amount of surface topology. When pressure sensitive adhesive layers are used to join structures with substantial step heights or other abrupt features, there is a risk that bubbles or voids may develop. The risk of bubble formation may be reduced by using softer pressure sensitive adhesive materials, but this tends to weaken bond strength and other desirable properties.

Liquid adhesives can be used to overcome step height discontinuities, because liquid adhesives can flow over abrupt features. However, the process of joining electronic device structures using liquid adhesives is often disfavored because of the challenges associated with using liquid adhesives in a production environment.

It would therefore be desirable to be able to provide improved ways to join structures such as electronic device structures using adhesive.

SUMMARY

Structures such as layers of material associated with an electronic device or other structures may be assembled using adhesive. The layers of material may include layers of glass or polymer associated with a display, layers of glass or polymer associated with a touch pad, or layers of material or other device structures associated with an electronic device.

The adhesive may be dispensed onto the surface of an electronic device layer in liquid form. The liquid adhesive material may be a liquid pressure sensitive adhesive precursor material. Patterned structures such as touch sensor electrodes, black ink masking layers, and other structures may be previously formed on the electronic device layer. These structures may have edges that are characterized by a step height. The use of liquid adhesive material may help the adhesive material flow over the edges of the patterned structures without forming bubbles or voids due to the presence of the step height.

Following application of the liquid pressure sensitive adhesive precursor material, the liquid pressure sensitive adhesive precursor material may be cured to form a solid layer of pressure sensitive adhesive. The layer of material on which the solid layer of pressure sensitive adhesive has been formed may then be laminated to an additional electronic device layer using a pressure sensitive adhesive lamination tool.

Further features of the invention, its nature and various advantages will be more apparent from the accompanying drawings and the following detailed description.

DETAILED DESCRIPTION

Figure 1:
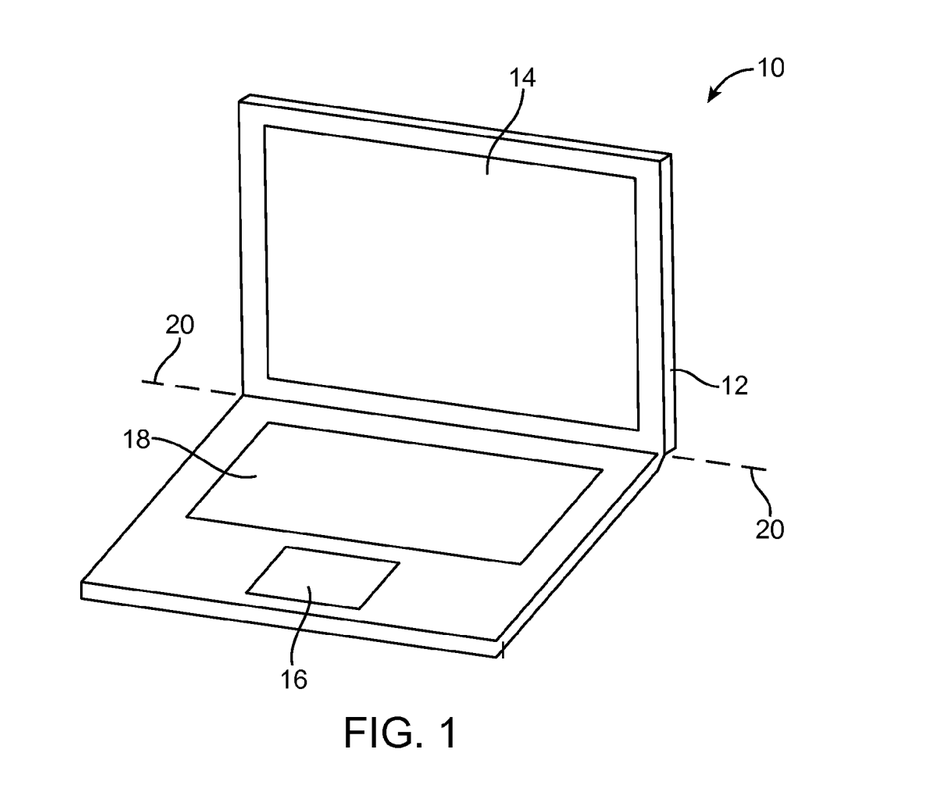
FIG. 1 is a perspective view of an illustrative electronic device such as a portable computer having structures that may be joined using adhesive in accordance with an embodiment of the present invention.
Figure 2:
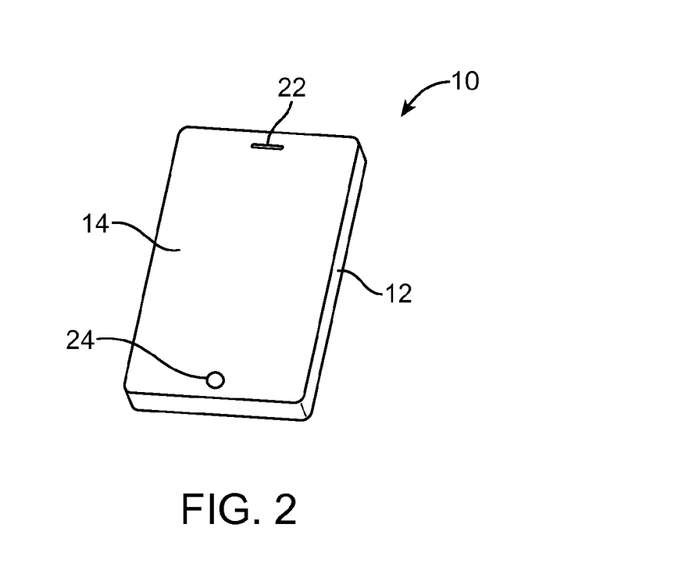
FIG. 2 is a perspective view of an illustrative electronic device such as a cellular telephone or other handheld electronic device of the type that may have device structures that may be joined using adhesive in accordance with an embodiment of the present invention.

Electronic devices may be provided with structures that are assembled using adhesive. Illustrative electronic devices of the type that may be provided with structures that are assembled using adhesive are shown in FIGS. 1 and 2. Electronic device 10 of FIG. 1 may be, for example, a portable computer. Electronic device 10 of FIG. 2 may be, for example, a handheld electronic device such as a cellular telephone or media player. In general, electronic device 10 may be any suitable equipment such as a personal computer, a tablet computer, a cellular telephone, a media player, a gaming device, a navigation device, or other electronic equipment. Structures may also be assembled using adhesive that are not part of an electronic device. The assembly of electronic device structures is sometimes described herein as an example.

As shown in FIG. 1, device 10 may have a housing such as housing 12 and a display such as display 14. Housing 12 may be formed from glass, plastic, metal, carbon-fiber composites and other fiber-based composites, other materials, or combinations of these materials. Display 14 may be a plasma display, an organic light-emitting diode display, a liquid crystal display, or other suitable display. The surface of display 14 may be covered with a cover layer of glass, plastic, or other transparent material.

Housing 12 may have a hinge that joins upper and lower housing portions. The upper and lower housing portions may rotate relative to each other about hinge axis 20. The upper housing portion may be used to house display 14. Input-output components such as touch pad 16 and keyboard 18 may be mounted in the lower portion of housing 12.

FIG. 2 is a perspective view of another illustrative configuration that may be used for device 10. In the example of FIG. 2, device 10 has been provided with display 14 in housing 12. Display 14 may be covered with a display cover layer such as a layer of cover glass or a plastic cover layer. Openings may be formed in the cover layer or other portion of display 14 such as speaker port opening 22 and menu button opening 24. Additional openings in display 14 and housing 12 may be used to accommodate input-output connectors such as audio connectors and data connectors and other input-output components.

The illustrative electronic equipment of FIGS. 1 and 2 and other electronic devices may have components that can be assembled using adhesive. In some scenarios, the structures that are assembled together may be planar structures such as planar layers of glass, plastic, metal, printed circuit board structures (e.g., rigid printed circuit boards such as fiberglass-filled epoxy boards such as FR4 boards, flexible printed circuits such as sheets of polyimide or other polymer layers with patterned metal traces ("flex circuits"), "rigid flex" printed circuits that include regions of rigid printed circuit board material with flex circuit tails), housing structures, planar structures associated with a display, planar structures associated with an input-output device such as a touch pad or touch screen (e.g., a printed circuit with touch pad electrodes, a covering glass layer for a touch pad, other touch pad substrates and cover layers, etc.), planar structures associated with a planar housing, or other planar structures. In other situations, some or all of the structures being assembled with the adhesive may be non-planar structures (e.g., non-planar housing structures, etc.). Examples in which the structures being assembled are planar structures such as display layers and touch pad layers are sometimes described herein as an example. This is, however, merely illustrative. Any suitable structures may be assembled using adhesive if desired.

Figure 3:
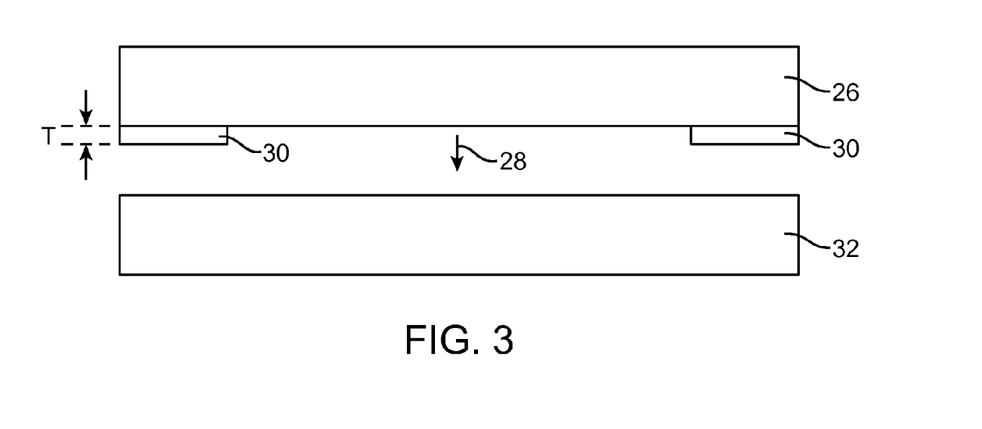
FIG. 3 is a side view of illustrative device structures such as display structures that may be joined using adhesive in accordance with an embodiment of the present invention.

FIG. 3 is a side view of illustrative structures of the type that may be assembled using adhesive. In the example of FIG. 3, upper layer 26 is being attached to lower layer 32. Layers 26 and 32 may be, for example, layers in a display such as display 14. One or both of layers 26 and 32 may be rigid by virtue of being formed from a rigid material or being attached to rigid structures. For example, layers 26 and 32 may be formed from rigid layers of glass, rigid layers of plastic, flexible layers of plastic attached to rigid structures such as glass structures. Layers 26 and 32 may also be formed from flexible sheets of material. Examples of display layers that may be assembled using adhesive include a cover layer, a polarizer layer, an anti-scratch layer, an anti-smudge layer, an antireflection layer, a touch panel layer, a color filter layer, a thin-film transistor layer, and backlight structure layers. As an example, layer 26 may be a display cover layer and layer 32 may be an upper polarizer or other layer associated with a liquid crystal display. Other display components (e.g., flexible and/or rigid display layers) may be attached using adhesive if desired. The assembly of display structures such as a cover layer and polarizer layer is merely illustrative.

As shown in FIG. 3, upper layer 26 (e.g., a display cover layer or other planar layer) may have surface structures such as structures 30 that have an associated thickness T. Structures 30 may, for example, be opaque masking layer structures that surround a peripheral portion of display 14 (e.g., a layer of black ink that has been formed on the underside of layer 26 in the form of a rectangular ring-shaped border for display 14). The thickness T of layer 30 may be, for example, about 10-40 microns (as an example).

To join upper layer 26 to lower layer 32, upper layer 26 may be moved towards layer 32, as illustrated by arrow 28.

Figure 4:
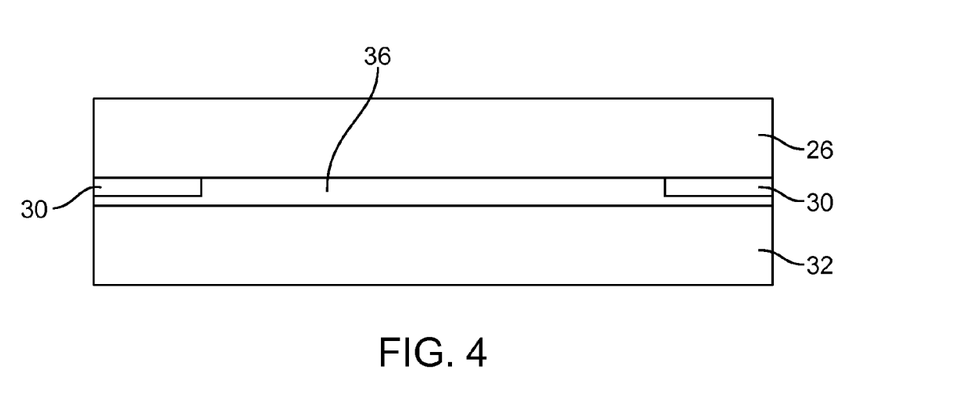
FIG. 4 is a side view of the illustrative device structures of FIG. 3 following assembly using adhesive in accordance with an embodiment of the present invention.

As shown in FIG. 4, adhesive layer 36 may be interposed between upper layer 26 and lower layer 32. Adhesive layer 36 may be used to join upper layer 26 and lower layer 32. Adhesive layer 36 is preferably formed by dispensing adhesive material as a liquid on layer 26, so that the adhesive covers the step generated at the edges of features 30. The liquid may be cured to form a solid pressure sensitive adhesive layer. The upper and lower layers may then be joined using lamination equipment to produce an assembly of the type shown in FIG. 4.

With this type of arrangement, upper layer 26 is joined to lower layer 32 using a layer of solid pressure sensitive adhesive in a pressure sensitive adhesive (PSA) lamination scheme, which is less complex than using lamination schemes involving liquid adhesive. At the same time, because adhesive 36 is initially dispensed in the form of a liquid material, adhesive 36 is able to satisfactorily flow over steps in features 30 (e.g., edge heights of thickness T), thereby avoiding the drawbacks of using a layer of conventional pressure sensitive adhesive such as the need to using thick soft layers to avoid bubbles and voids.

Figure 5:
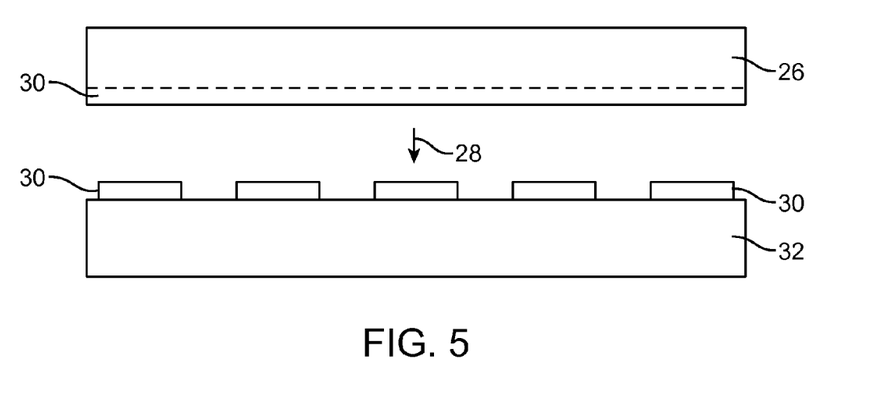
FIG. 5 is a side view of illustrative device structures such as structures associated with a touch pad in an electronic device that may be joined using adhesive in accordance with an embodiment of the present invention.
Figure 6:
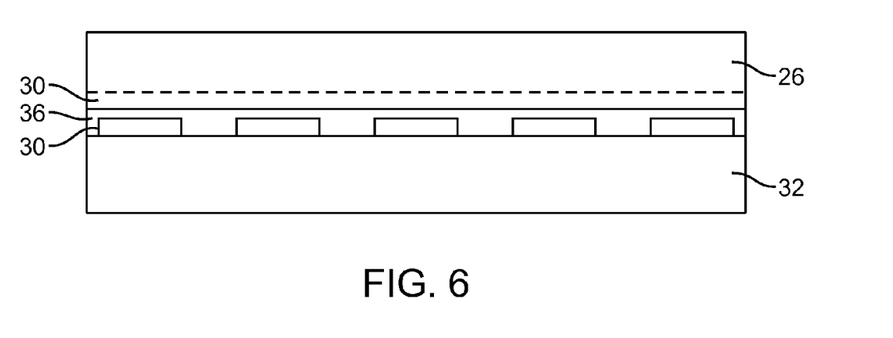
FIG. 6 is a side view of the illustrative device structures of FIG. 5 following assembly using adhesive in accordance with an embodiment of the present invention.

In the example of FIGS. 5 and 6, upper layer 26 may be a glass layer or other planar structure and lower layer 32 may be a substrate layer (as examples). Upper layer 26 and lower layer 32 may, for example, be an upper and lower layer in a touch pad such as touch pad 16 of FIG. 1. Touch pads may include capacitive electrodes that exhibit abrupt changes in height at their edges, as illustrated by features 30 on layer 32 of FIG. 5. The height of each pad 30 may, for example, be about 30 microns, about 20-40 microns, or about 10-40 microns (as examples). Layer 26 may also include features 30 (e.g., planar or non-planar structures exhibiting a thickness of about 10-40 microns, etc.). The non-planar features 30 on layer 32 may be coated with liquid adhesive. The liquid adhesive may be cured to form a solid layer of pressure sensitive adhesive on layer 32. Layers 26 and 32 may then be laminated together using lamination equipment or other suitable equipment.

The resulting laminated structure that is formed by attaching layers 26 and 32 in this way is shown in FIG. 6. As shown in FIG. 6, solid pressure sensitive adhesive layer 36 may be interposed between layers 26 and 32 and, because layer 36 was initially deposited in the form of a liquid, layer 36 may satisfactorily cover the edges of features 30 without forming bubbles or voids.

In general, layers 26 and 32 may be associated with any structures in electronic device 10 such as planar display structures, planar touch pad structures, planar housing structures, or other planar structures, non-planar device structures, etc.

Figure 7:
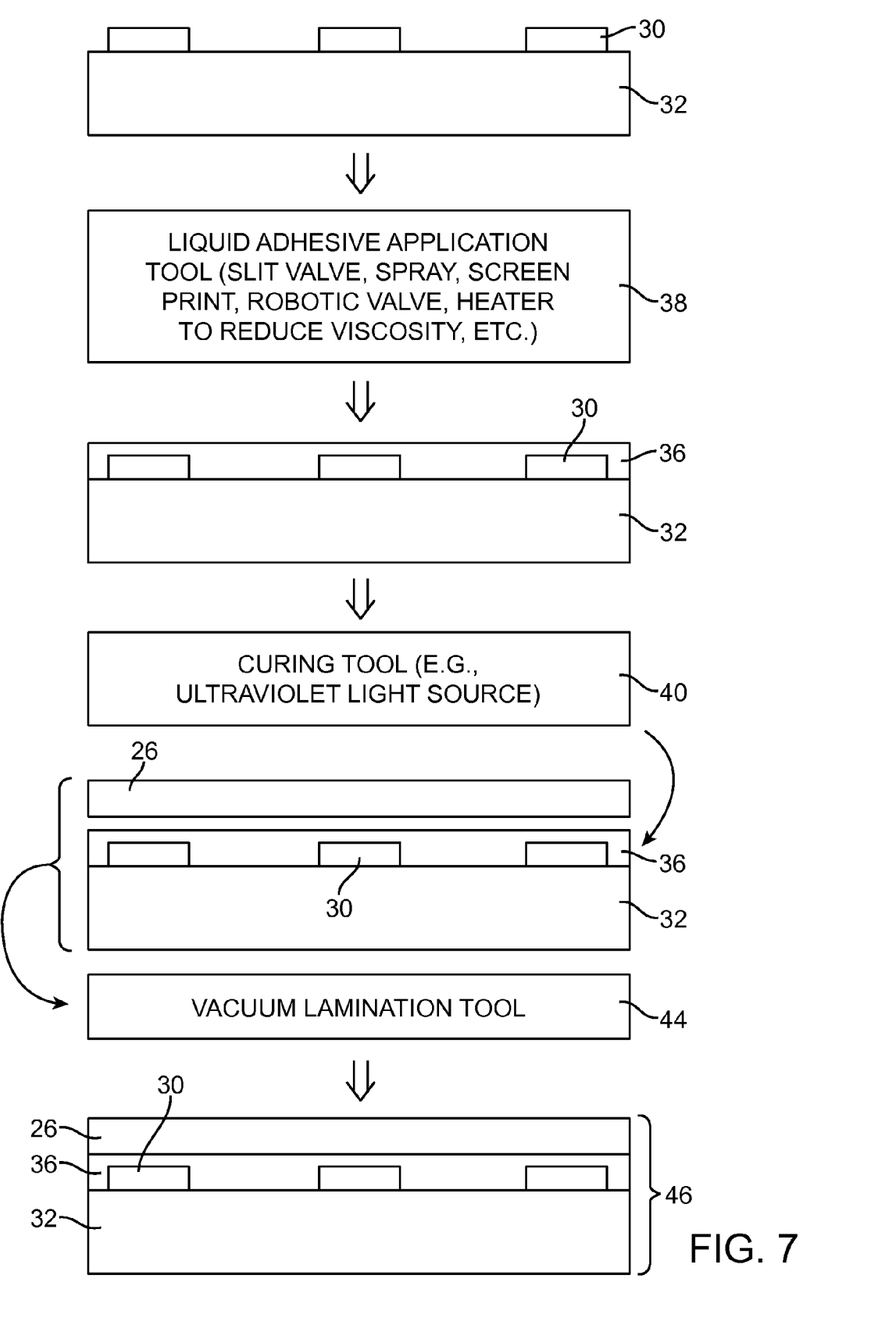
FIG. 7 is a diagram showing equipment and assembly operations that may be used in assembling device structures using adhesive in accordance with an embodiment of the present invention.

FIG. 7 is a diagram that shows equipment and assembly operations that may be associated with assembling structures such as layers 26 and 32 using adhesive 36.

Initially, layer 32 may be covered with non-planar structures such structures 30. The edges of structures 30 may be characterized by a step in height (vertical dimension change) of about 10-40 microns, of 50 microns or less, 100 microns or less, 10-100 microns, 10 microns or more, or other suitable thickness. It may be difficult or impossible to satisfactorily cover features of this type using a sheet of conventional pressure sensitive adhesive, because conventional techniques may require the use of an excessively thick and/or soft pressure sensitive adhesive layer.

As shown in FIG. 7, this challenge associated with the use of conventional pressure sensitive adhesive attachment techniques can be addressed by forming a conformal layer of pressure sensitive adhesive using a multistep process. Initially, a layer of liquid adhesive (e.g., a liquid monomer pressure sensitive adhesive precursor) may be applied to the surface of layer 32 using liquid adhesive application tool 38. Because adhesive 36 is liquid when applied by tool 38, adhesive 36 may coat features 30 on layer 32 without risk of forming bubbles or voids at the edges of features 30. Following application of the liquid precursor layer, the liquid adhesive layer may be cured using curing tool 40 to produce a solid (cured) pressure sensitive adhesive layer. The pressure sensitive adhesive layer that is produced by tool 40 may be attached to upper layer 26 using pressure sensitive adhesive lamination tool 44, thereby producing assembled structures 46 of FIG. 7. Lamination tool 44 may be hard-to-hard lamination equipment, hard-to-soft lamination equipment, soft-to-soft lamination equipment, or other lamination equipment. Lamination tool 44 may, if desired, apply a vacuum to the layers of material that are being laminated together (i.e., tool 44 may be hard-to-hard vacuum lamination equipment, hard-to-soft vacuum lamination equipment, soft-to-soft vacuum lamination equipment). Lamination tool 44 may also be implemented without vacuum capabilities and/or include autoclave equipment (e.g., equipment that performs lamination operations by applying an elevated pressure of about 2-100 atmospheres and an elevated temperature of about 50-100° C.)

Liquid adhesive application tool 38 may include equipment for dispensing liquid adhesive onto the surface of layer 32. Tool 38 may, for example, use a robotically or manually controlled liquid adhesive dispensing valve such as a slit valve or other valve to dispense liquid adhesive on the surface of layer 32. Liquid adhesive may also be dispensed on the surface of layer 32 using spraying, screen printing, pad printing, or other liquid adhesive application techniques. The liquid adhesive may be heated to reduce its viscosity. Liquid adhesive heating operations may be performed on the liquid adhesive before applying the adhesive to layer 32, during the process of dispensing liquid adhesive onto layer 32, or after applying the liquid adhesive to the surface of layer 32. As an example, liquid adhesive that has been applied to layer 32 may be planarized by placing layer 32 on a heated surface and/or by exposing the surface of layer 32 and the liquid adhesive on layer 32 to an infrared lamp or other heat source to raise the temperature of the liquid adhesive to about 60-70° C. or other elevated temperature. The primary purpose of heating the adhesive is to reduce viscosity and "flow" the adhesive to form a planar surface. If desired, liquid adhesive that has a sufficiently low viscosity to form a planar surface without heating may be deposited.

After a liquid adhesive layer has been formed on layer 32 to coat layer 32 while avoiding bubbles and voids at the edges of non=planar features 30 of layer 32, tool 40 may be used to cure the liquid adhesive to form a solid layer of pressure sensitive adhesive. The curing process may be performed by applying heat, ultraviolet (UV) light, or other curing stimulus to the liquid adhesive using curing tool 40. Curing tool 40 may, for example, be a UV light source such as a UV lamp that converts the monomer precursor material of the liquid adhesive into a solid (non-liquid) pressure sensitive adhesive polymer (e.g., by promoting cross linking of the monomers in the liquid adhesive layer).

The resulting layer of pressure sensitive adhesive on the surface of layer 32 (prior to attachment of additional layer 26) may be characterized by satisfactory planarity and coverage over the steps in height produced by the edges of surface features 30, while simultaneously being sufficiently solid (non-liquid) following curing with tool 40 to avoid the handling difficulties associated with liquid adhesive lamination operations.

Because curing tool 40 produces a solid (non-liquid) pressure sensitive adhesive layer on the surface of layer 32, lamination tool 44 may be a pressure sensitive adhesive lamination tool of the type that is configured to laminate opposing layers of material using a solid interposed layer of pressure sensitive adhesive (i.e., to laminate layers 26 and 32 to produce laminated structures 46). Structures (assembly) 46 may be associated with structures in display 14 such as a display cover layer and underlying display layers, may be associated with layers in a touch pad such as touch pad 16 of FIG. 1, or may be associated with other device structures such as other planar device structures (as examples).

Figure 8:
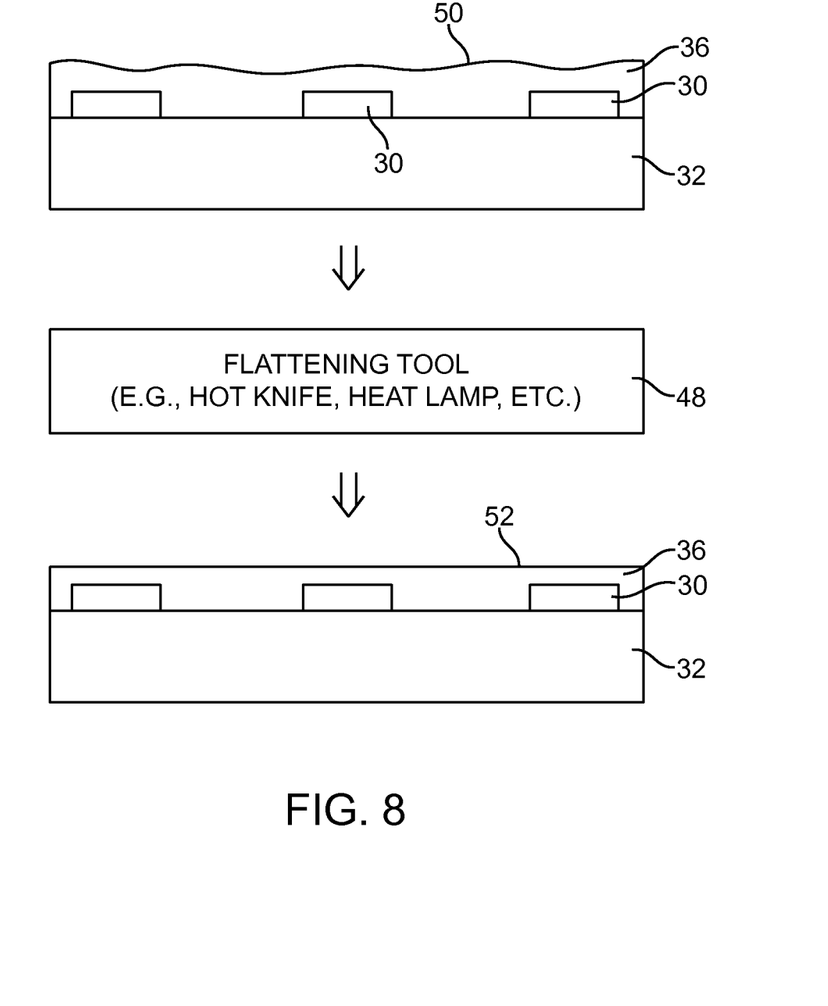
FIG. 8 is a diagram showing how a planarization tool may optionally be used to help planarize a layer of adhesive during the assembly operations of FIG. 7 in accordance with an embodiment of the present invention.

FIG. 8 shows how optional adhesive planarization operations may be performed during an assembly process of the type shown in FIG. 7. Following curing of liquid adhesive layer 36 to form pressure sensitive adhesive layer 36 of FIG. 8, the surface of layer 36 (i.e., surface 50 of FIG. 8) may be rough. To smooth surface 50, layer 50 may be planarized using flattening (planarization) tool 48. Flattening tool 48 may include layer flattening equipment such as a hot knife, a heat lamp to promote adhesive reflow operations (e.g., to reflow and thereby planarize adhesive layer 36 following curing), a press that presses a planar tool member against a release liner and thereby flattens layer 36, or other planarization equipment. Following planarization with flattening tool 48, irregular surface 50 of adhesive layer 36 may be characterized by a planar surface such as smooth planarized surface 52 of FIG. 8. If desired, planarization operations with equipment such as equipment 48 (and/or equipment 38 of FIG. 7) may also be performed prior to adhesive curing, as described in connection with FIG. 7.

If desired, a removable patterned structure such as a patterned polymer sheet that forms a dam structure may be used to help control the flow of liquid adhesive 36 before curing. This type of approach for joining layers 26 and 32 is shown in FIGS. 9 and 10.

Figure 9:
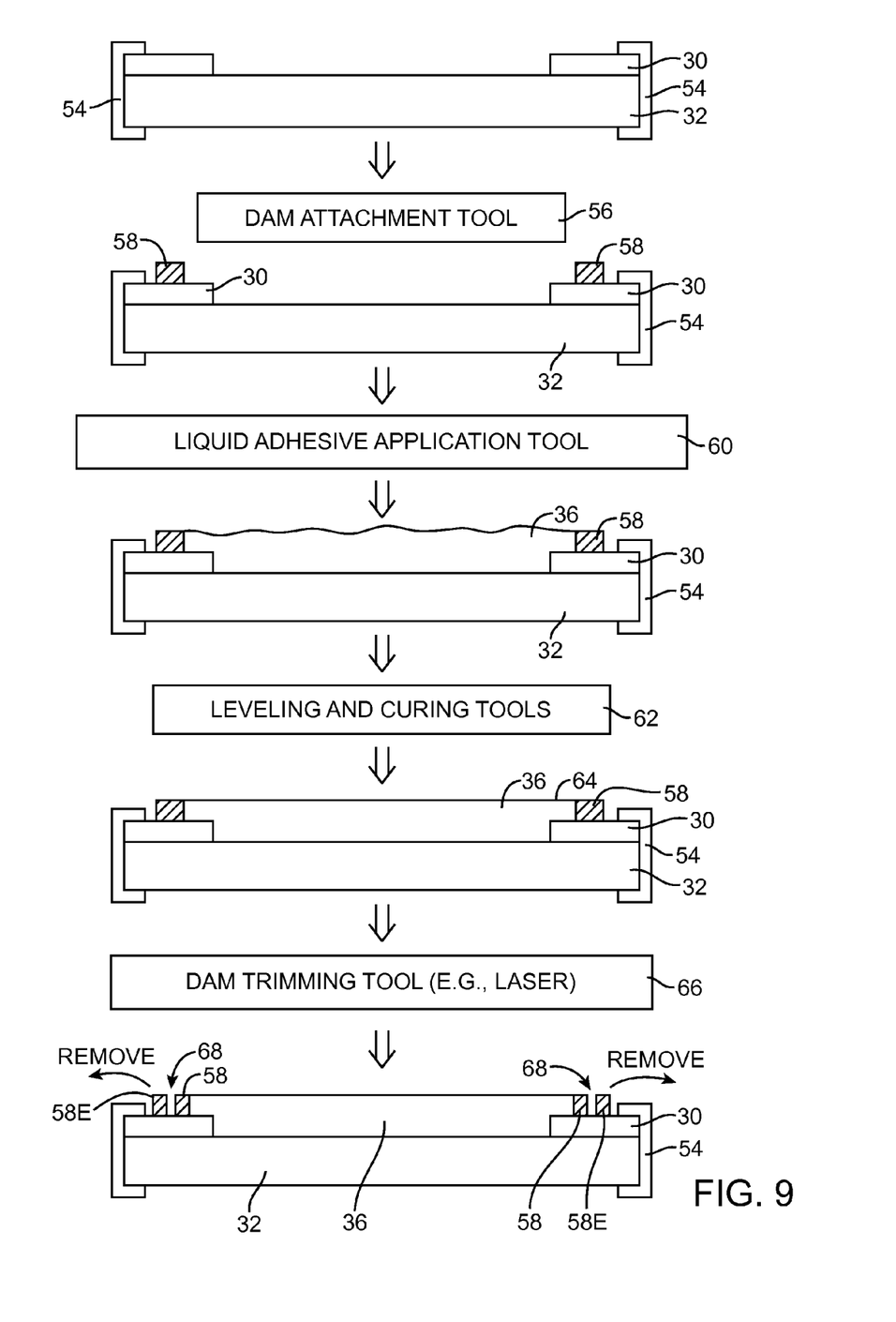
FIG. 9 is a diagram showing equipment and assembly operations that may be used in applying an adhesive dam structure and that may be used in applying adhesive during device structure assembly operations in accordance with an embodiment of the present invention.
Figure 10:
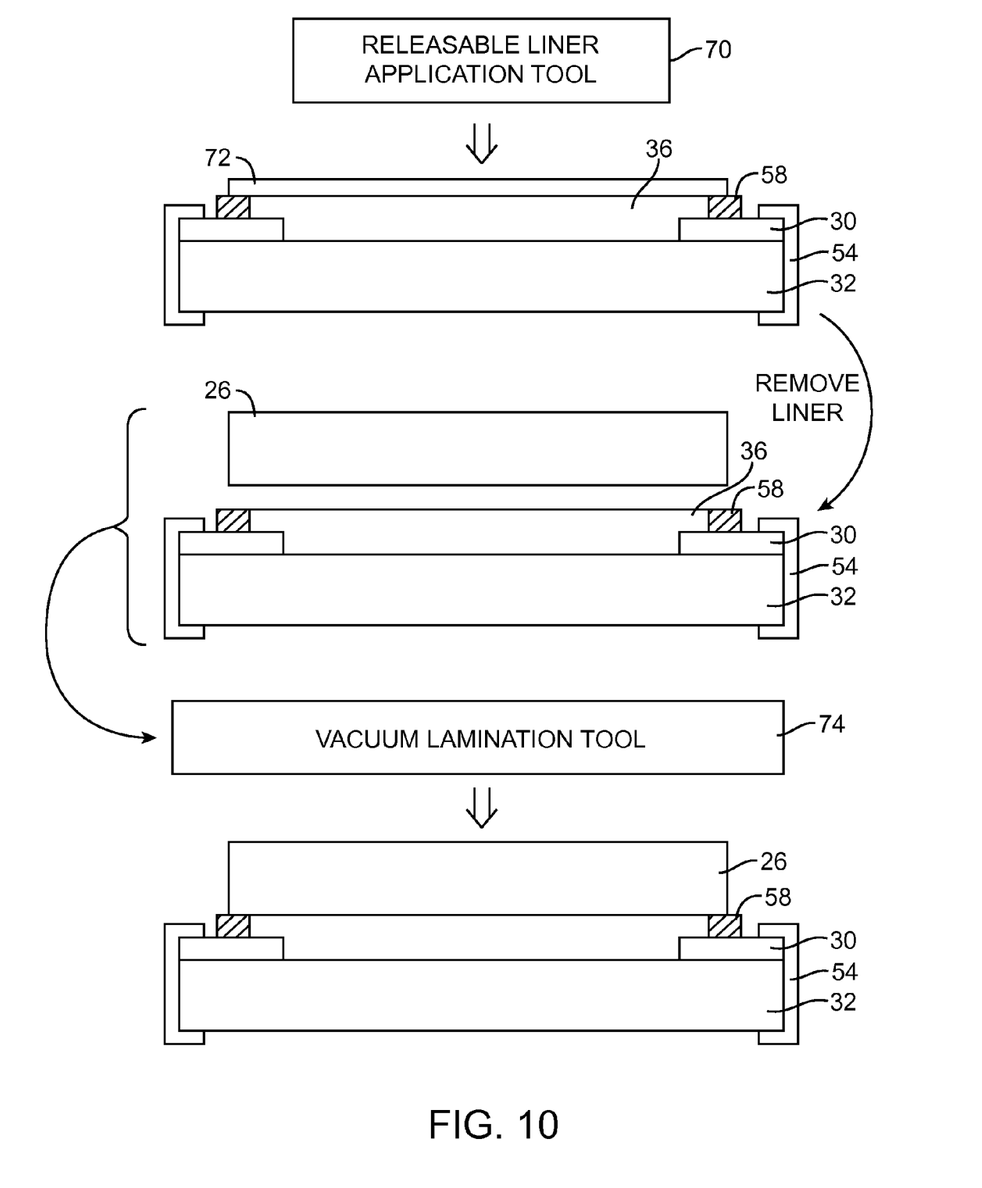
FIG. 10 is a diagram of additional equipment and assembly operations that may be used during device structure assembly operations following the operations of FIG. 9 in accordance with an embodiment of the present invention.

As shown in FIG. 9, prior to dispensing liquid adhesive, layer 32 may be fabricated. Layer 32 may, for example, include non-planar surface structures such as surface features 30 and, if desired, optional additional structures such as housing frame structures 54.

Dam attachment tool 56 (e.g., equipment for automatically and/or manually applying a patterned layer of polymer using a removable adhesive) may be used to apply a layer of material such as dam structures 58. Structures 58 may be held in place on layer 32 (e.g., on surface features 30 or elsewhere on layer 32) using a reworkable adhesive on the lower surface of structures 58 (i.e., an adhesive that forms a temporary bond that has sufficient strength to hold dam structures 58 in place during assembly operations while being sufficiently weak to allow structures 58 (or at least portions of structures 58) to be removed by peeling later in the assembly process if desired.

Other types of attachment mechanisms may be used for dam structures 58 if desired (e.g., more permanent adhesive, etc.).

Following attachment of dam structures 58 of FIG. 9, liquid adhesive 36 (e.g., a liquid monomer pressure sensitive adhesive precursor material) may be applied to layer 32 using liquid adhesive application tool 60 (e.g., a tool that includes equipment such as liquid adhesive application equipment 38 FIG. 7). The liquid adhesive material may coat surface 32 and features 30 on surface 32 with minimal risk of introducing bubbles or voids. The shape and location of patterned dam structure 58 may be selected so as to at least partly laterally confine the liquid pressure sensitive adhesive precursor material that is applied using tool 60.

Following formation of the layer of liquid adhesive, equipment 62 may be used to cure and level the liquid adhesive to form cured solid pressure sensitive adhesive layer 36 with planar surface 64. Equipment 62 may include curing equipment such as UV curing equipment 40 of FIG. 7 or other equipment that can cross link the monomers of the liquid adhesive layer to form solid polymeric pressure sensitive adhesive layer 36 with planar surface 64. Equipment 62 may also include leveling equipment such flattening tool 48 of FIG. 8) to help planarize adhesive layer 36 (e.g., following curing or, if desired, prior to curing).

During the curing and leveling process, some of adhesive layer 36 may spread laterally outward over portions of the surface of dam structure 58. If desired, this type of laterally spread adhesive and excess portions of dam structure 58 may be removed by trimming dam structure 58. As shown in FIG. 9, for example, dam trimming tool 66 may be used to form cut 68 in structure 58 to allow structure 58E to be removed from layer 32 (e.g., by peeling portion 58E away from layer 32 to leave behind trimmed structure 58). Dam trimming tool 66 may include a laser to perform laser trimming operations, a knife or other scoring tool to perform cutting operations, or other equipment for trimming dam structure 58.

After edge portion 58E of dam structure 58 of FIG. 9 has been removed from layer 32, equipment of the type shown in FIG. 10 may be used to complete assembly operations. Equipment such as releasable liner application tool 70 may, if desired, be used to apply releasable liner layer 72 to the surface of solid pressure sensitive adhesive layer 36. Liner 72 may be formed from a flexible sheet of polymer and may be covered with a non-stick coating to facilitate release of liner 72 from adhesive layer 36. Tool 70 may include a manually and/or automatically controlled roller, a planar structure that presses liner 72 downwards against the surface of adhesive 36, or other liner attachment equipment.

Following application of liner 72, layer 32 may be transported to a desired location for finalizing assembly layers 26 and 32. The presence of liner 72 may help protect the surface of pressure sensitive adhesive layer 36 during transport.

Before attaching layer 26 to layer 32, liner 72 may be removed from pressure sensitive adhesive layer 36. Pressure sensitive adhesive lamination tool 74 (e.g., a tool such as tool 44 of FIG. 7) may then be used to perform lamination operations, thereby laminating layer 26 to layer 32. As shown at the bottom of FIG. 10, the resulting assembled structure includes upper layer 26, lower layer 32, and an interposed layer of pressure sensitive adhesive (layer 36).

Figure 11:
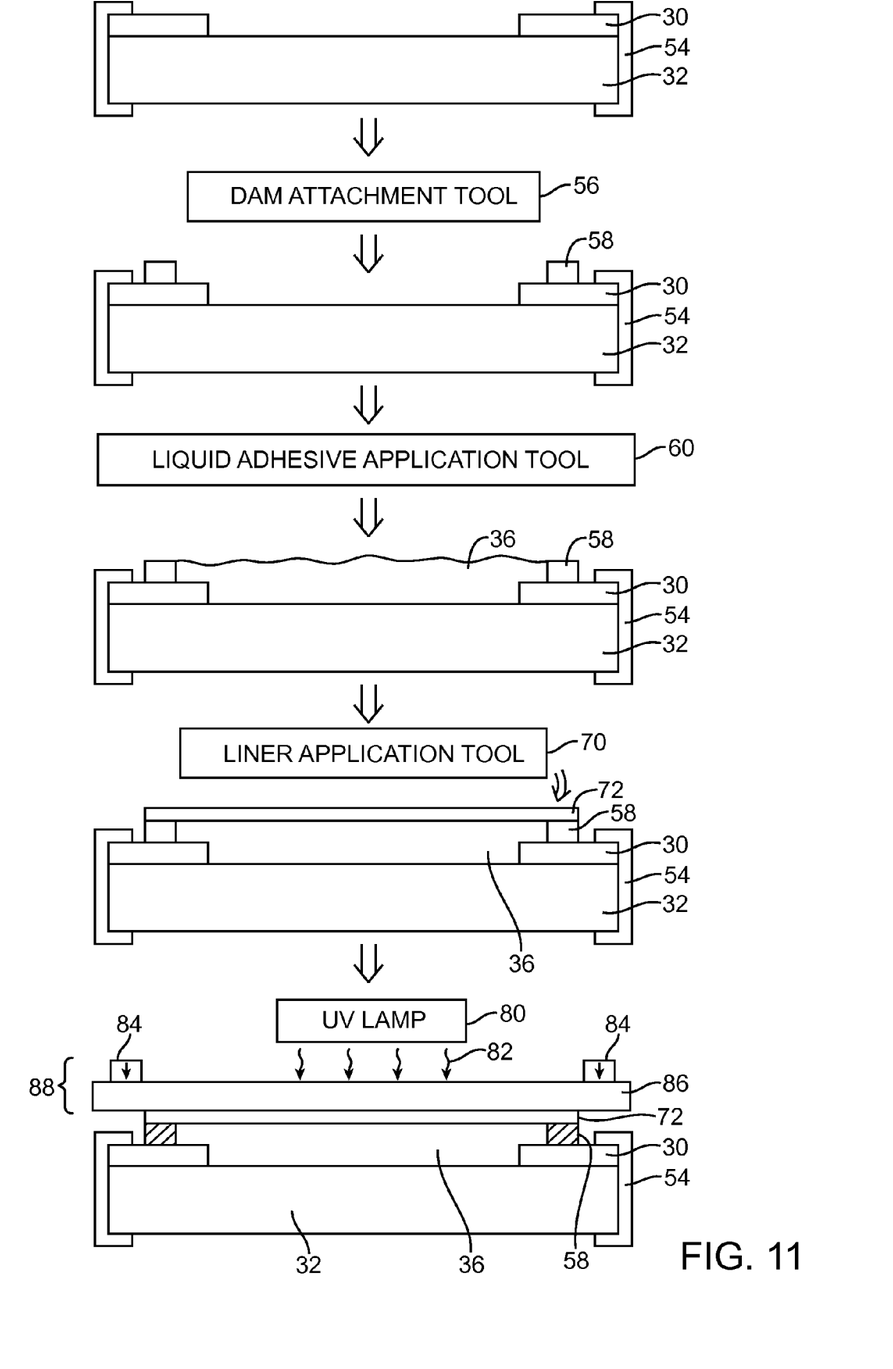
FIG. 11 is a diagram of illustrative equipment and assembly operations that may be used to assembly device structures in accordance with another embodiment of the present invention.

Another illustrative approach for assembling layers 26 and 32 is shown in FIG. 11.

As shown in FIG. 11, dam attachment tool 56 may be used to attach dam structures 58 to layer 32 before application of adhesive 36.

Following attachment of dam structures 58, liquid adhesive application tool 60 may be used to apply liquid monomer pressure sensitive adhesive precursor material to the surface of layer 32. Because the precursor material is liquid, the precursor material will flow over structures 30 and will create a satisfactory conformal coating layer on the surface of layer 32.

Prior to curing, linear application tool 70 may be used to attach release liner 72 to layer 32 on top of liquid adhesive 36. Release liner 72 may be formed from a flexible sheet of polymer with a coating to prevent liner 72 from permanently sticking to adhesive 36. Liner 72 of FIG. 11 is preferably sufficiently transparent to ultraviolet light to allow ultraviolet light to pass through liner 72 to underlying adhesive 36 during curing operations.

To promote planarity in the surface of pressure sensitive adhesive layer 36, equipment 88 may press a planar member downwards onto the top of layer 72 and adhesive 36 during curing operations. Equipment 88 may be flattening (planarization) equipment such as manual or computer-controlled equipment that uses positioners 84 and clear plate 86 to press downwards on layer 72. Plate 86 may be formed from a layer of material such as fused silica, a layer of transparent ceramic, plastic, or glass, or other clear planar structure. When pressed downwards against the surface of adhesive layer 36, the surface of adhesive layer 36 may be planarized. While being flattened by plate 86 in this way, adhesive curing equipment such as ultraviolet light source 80 may be used to illuminate liquid adhesive layer 36 with ultraviolet light 82. Light 82 may pass through transparent plate 86 and release liner 72. The application of light 82 or other suitable curing stimulus (e.g., heat) may promote cross linking of the monomers in the liquid adhesive layer to form a solid polymer pressure sensitive adhesive layer such as layer 36 at the bottom of FIG. 11.

Assembly of layers 26 and 32 may then be completed using lamination tool 74, as shown in FIG. 10.

The assembled structures that include layers 26 and 32 (and any additional structures that are attached to these layers) may be assembled into finished electronic devices 10 such as devices 10 of FIGS. 1 and 2. Because thin pressure sensitive adhesive layers 36 and layers 36 that are not excessively soft may be used in attaching layers 26 and 32 together, devices 10 may be more compact and/or may contain stronger adhesive bonds than devices formed using conventional pressure sensitive adhesive lamination techniques.

If desired, trimming operations such as laser trimming operations may involve forming a cut in adhesive 36 that allows substantially all of dam structure 58 to be removed during trimming. This type of trimming operation is shown in FIG. 12.

Initially, dam structure 58 may be formed on layer (e.g., using dam attachment tool 56 of FIG. 11). Following attachment of dam structure 58, a dispensing tool such as liquid adhesive application tool 60 may be used to apply liquid monomer pressure sensitive adhesive precursor material to the surface of layer 32. Because the precursor material is liquid, the precursor material will flow over structures 30 and will create a satisfactory conformal coating layer on the surface of layer 32. Dam structure 58 may help contain the liquid adhesive material around the edges of layer 32.

Layer 36 may then be planarized and cured. For example, planarization operations may be performed using a pressurized liner of the type described in connection with FIG. 11. Curing may be performed using a UV lamp (e.g., lamp 80 of FIG. 11).

Figure 12:
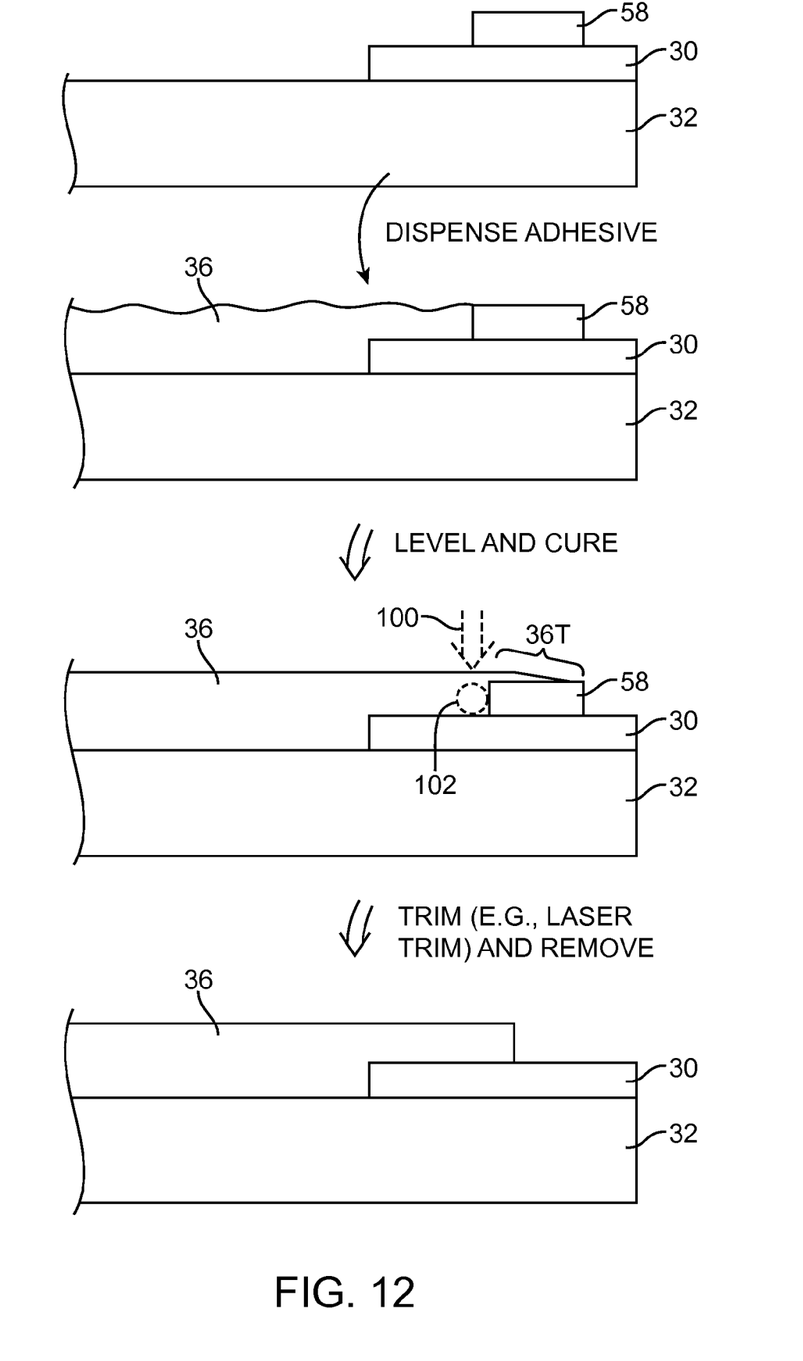
FIG. 12 is a diagram showing operations that may be involved in dispensing adhesive adjacent to a dam structure and performing dam structure trimming operations in accordance with an embodiment of the present invention.

As part of the planarization process (e.g., when pressing downwards on liner 72 of FIG. 11, some of adhesive 36 may be forced laterally outward over the edge of dam structure 58, forming portion 36T of FIG. 12.

As shown in FIG. 12, a laser beam such as beam 100 may be applied using laser trimming equipment. The laser beam may be applied along the innermost edge of dam structure 58 to remove portion 102 of adhesive layer 36 (and possibly portions of the inner edge of dam structure 58). By cutting through adhesive layer 36, portion 36T of adhesive layer 36 and dam structure 58 may be trimmed away from the rest of layer 36. Following removal of the trimmed away portion of dam structure 58 and adhesive portion 36T, a trimmed version of layer 36 may remain on layer 32. Because dam structure 58 has been removed from layer 32, dam structure 58 will not interfere with subsequent lamination operations.

If desired, layer 36 may be planarized by depositing layer 36 in multiple thinner sublayers rather than a single layer. The use of multiple sublayers may help each sublayer flow to conform to underlying surface topology, resulting in a smooth flat surface for the resulting composite layer formed from the multiple sublayers.

Figure 13:
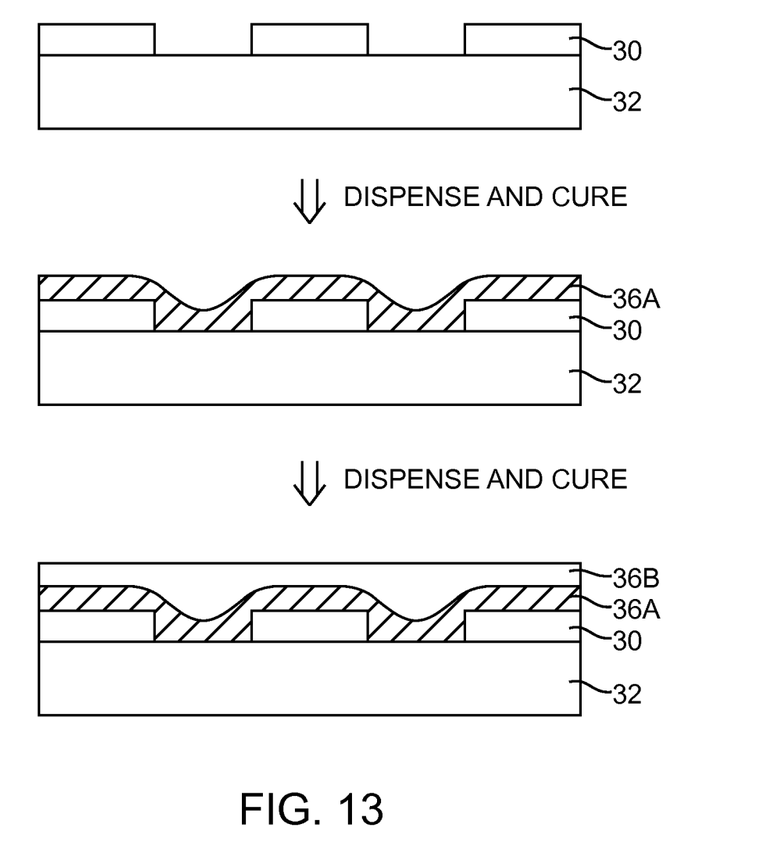
FIG. 13 is a diagram showing how a layer of adhesive may be deposited by performing multiple liquid adhesive dispensing and curing operations to form the layer of adhesive from multiple sublayers of adhesive in accordance with an embodiment of the present invention.

The use of multilayer adhesive dispensing techniques to flatten layer 36 is illustrated in FIG. 13. In the example of FIG. 13, a first dispensing and curing cycle has been used to deposit adhesive layer 36A. Following formation of sublayer 36A, one or more additional liquid adhesive dispensing and curing operations may be used to form additional sublayers such as sublayer 36B. There may be, for example, two or more sublayer deposition cycles, three or more sublayer deposition cycles, four or more sublayer deposition cycles, etc. Sublayers may be dispensed using liquid adhesive application tools such as screen printing equipment, valves, etc. Curing may be performed using UV lamps or other equipment. Multilayer planarization operations of the type illustrated in FIG. 13 may be performed using equipment 38 and 40 of FIG. 7, may be used to perform flattening as described in connection with tool 48 of FIG. 8, may be used to implement the leveling and curing operations of tool 62 of FIG. 9, or may otherwise be used in flattening adhesive layer 36.

The foregoing is merely illustrative of the principles of this invention and various modifications can be made by those skilled in the art without departing from the scope and spirit of the invention.

What is claimed is:

1. A method for assembling electronic device structures that include a first layer and a second layer, comprising:
   dispensing a liquid pressure sensitive adhesive precursor material onto the first layer;
   curing the liquid pressure sensitive adhesive precursor material using a curing tool to create a layer of pressure sensitive adhesive on the first layer;
   following creation of the layer of pressure sensitive adhesive on the first layer, laminating the first and second layers together with the pressure sensitive adhesive so that the layer of pressure sensitive adhesive is interposed between the first and second layers, wherein the first layer comprises a surface on which an array of touch pad electrodes is formed, wherein the array of touch pad electrodes form a patterned set of surface structures on the first layer, wherein each touch pad electrode in the array of touch pad electrodes has respective first and second opposing surfaces, wherein the first surface is in direct contact with the first layer, and wherein the second surface is separated from the first layer by a step height, and wherein dispensing the liquid pressure sensitive adhesive precursor material comprises coating the surface of the first layer and the array of touch pad electrodes on the surface of the first layer with the liquid pressure sensitive adhesive precursor material; and
   applying a dam structure to portions of the first layer, comprising:
      using an adhesive to attach portions of the dam structure to the portions of the first layer, wherein the dam structure is configured to at least partly laterally confine the liquid pressure sensitive adhesive precursor material.

2. The method defined in claim 1 wherein laminating the first and second layers comprises vacuum laminating the first and second layers using pressure sensitive adhesive vacuum lamination equipment.

3. The method defined in claim 2 wherein the first and second layers comprise rigid layers and wherein laminating the first and second layers together comprises laminating the rigid layers together.

4. The method defined in claim 2 wherein the first and second layers comprise first and second display layers in a display and wherein laminating the first and second layers together comprises laminating the first and second display layers together.

5. The method defined in claim 1 wherein the first and second layers comprise touch pad layers and wherein laminating the first and second layers together comprises laminating the touch pad layers together.

6. The method defined in claim 1 wherein the first and second layers comprise rigid layers including at least one layer of glass, wherein laminating the first and second layers together comprises laminating the rigid layers together, wherein the curing tool comprises an ultraviolet light source, and wherein curing the liquid pressure sensitive adhesive precursor material using the curing tool to create the layer of pressure sensitive adhesive on the first layer comprises applying ultraviolet light to the layer of liquid pressure sensitive adhesive precursor material using the ultraviolet light source.

7. The method defined in claim 1 wherein the curing tool comprises an ultraviolet light source and wherein curing the liquid pressure sensitive adhesive precursor material using the curing tool to create the layer of pressure sensitive adhesive on the first layer comprises applying ultraviolet light to the layer of liquid pressure sensitive adhesive precursor material using the ultraviolet light source.

8. The method defined in claim 1 further comprising removing at least some of the dam structure using trimming equipment.

9. The method defined in claim 8 wherein removing at least some of the dam structure using the trimming equipment comprises removing the dam structure using laser trimming.

10. The method defined in claim 1 further comprising applying a release liner to the liquid pressure sensitive adhesive precursor material.

11. The method defined in claim 10 further comprising flattening the release liner with a planar member.

12. The method defined in claim 11 wherein curing the liquid pressure sensitive adhesive precursor material using the curing tool comprises applying ultraviolet light to the liquid pressure sensitive adhesive precursor material through the planar member and the release liner after the release liner is flattened with the planar member.

13. The method defined in claim 12 further comprising removing the release liner before laminating the first and second layers.

14. The method defined in claim 1 wherein dispensing the liquid pressure sensitive adhesive precursor material onto the first layer comprises applying the liquid pressure sensitive adhesive precursor material using equipment selected from the group consisting of: a valve, spraying equipment, and screen printing equipment.

15. The method defined in claim 1 further comprising flattening the pressure sensitive adhesive before laminating the first and second layers together with the pressure sensitive adhesive.

16. The method defined in claim 15 wherein flattening the pressure sensitive adhesive comprises applying heat to the dispensed liquid pressure sensitive adhesive precursor material.

17. The method defined in claim 1 wherein dispensing the liquid pressure sensitive adhesive precursor material onto the first layer and curing the liquid pressure sensitive adhesive precursor material using the curing tool to create the layer of pressure sensitive adhesive on the first layer comprises:
    dispensing multiple sublayers of liquid pressure sensitive adhesive precursor material; and
    curing each of the sublayers of liquid pressure sensitive adhesive precursor material to form the layer of pressure sensitive adhesive on the first layer.

18. A method of assembling first and second electronic device layers, wherein at least the first electronic device layer has surface structures, wherein the surface structures each have first and second opposing surfaces connected by third and fourth opposing surfaces, and wherein the third surface of each surface structure is in direct contact with the first electronic device layer, the method comprising:
    applying a liquid pressure sensitive adhesive precursor material onto the first electronic device layer over the surface structures such that the liquid pressure sensitive adhesive precursor material directly contacts the first, second, and fourth surfaces of each surface structure;
    forming a patterned layer of ink on the first electronic device layer, wherein applying the liquid pressure sensitive adhesive precursor material comprises coating the first electronic device layer and the patterned layer of ink on the first electronic device layer with the liquid pressure sensitive adhesive precursor material;
    curing the liquid pressure sensitive adhesive precursor material to form a solid layer of pressure sensitive adhesive;
    laminating the first and second electronic device layers together with the solid layer of pressure sensitive adhesive; and
    applying a dam structure to portions of the first electronic device layer, comprising:
        using an adhesive to attach portions of the dam structure to the portions of the first electronic device layer, wherein the dam structure is configured to at least partly laterally confine the liquid pressure sensitive adhesive precursor material.

19. The method defined in claim 18 wherein the first electronic device layer comprises a layer of glass and wherein curing the liquid pressure sensitive adhesive precursor material comprises applying ultraviolet light to the liquid pressure sensitive adhesive precursor material.

20. The method defined in claim 19 further comprising:
    applying a release liner to the solid layer of pressure sensitive adhesive on the layer of glass.

21. The method defined in claim 9 wherein removing the dam structure using laser trimming further comprises removing the liquid pressure sensitive adhesive precursor material that has spread laterally outward over portions of the dam structure using laser trimming.

22. The method described in claim 18 wherein the surface structures are separated by gaps, and wherein the surface structures comprise touch sensor electrodes.

* * * * *